March 17, 1953     E. L. GAINES     2,631,610
FLUID CYCLING SYSTEM

Filed June 26, 1945     3 Sheets-Sheet 1

INVENTOR.
E. Lamar Gaines
BY Paul Bliven
ATTORNEY

March 17, 1953     E. L. GAINES     2,631,610
FLUID CYCLING SYSTEM

Filed June 26, 1945     3 Sheets-Sheet 2

INVENTOR.
E. Lamar Gaines
BY Paul Bliven
ATTORNEY

March 17, 1953

E. L. GAINES 2,631,610

FLUID CYCLING SYSTEM

Filed June 26, 1945

INVENTOR.
E. Lamar Gaines
BY
Paul Bliven

Patented Mar. 17, 1953

2,631,610

UNITED STATES PATENT OFFICE 2,631,610

FLUID CYCLING SYSTEM

Ernest Lamar Gaines, Seattle, Wash.

Application June 26, 1945, Serial No. 601,575

10 Claims. (Cl. 137—627)

1

The present invention relates to a fluid cycling system and in more particular, to improvement of the system shown in my prior Patent Number 2,068,102, granted January 19, 1937. This prior patent shows a fluid main having a series of branches connected thereto for the conduction of fluid from the main, and apparatus for controlling the flow of fluid from the main to the branches so that fluid flows in first one branch and then another. This system has worked very well in practice but it has often been found desirable that the flow of fluid in the branches be halted after a predetermined time or number of cycles of flow in the branches.

In the past this difficulty has been remedied only by manual operation of the system.

The present invention relates to an automatic control which may be set so that after a predetermined number of cycles of operation, the functioning of the system will be brought to a halt. Thus it will be seen that an object of the present invention is the construction of a fluid cycling system in which the number of cycles may be predetermined.

A further object of the present invention is the construction of a fluid actuated indexing valve, which after a predetermined number of cycles, will cut off the flow of fluid in a system.

A further object of the present invention is the construction of a fluid cycling system in which there is an indexing means for determining the number of cycles performed by the system.

Another object of the present invention is the construction of a fluid system in which there is incorporated an indexing valve actuated by variations of pressure in such system for indexing such valve and for shutting off the flow of fluid in said system by the fluid pressure of the system.

A further object of the present invention is the construction of an indexing valve which is operated by the fluid pressure to which the valve is subjected to index the valve and to cut off the flow of fluid through the valve after a predetermined number of indexings.

The above mentioned defects of the prior art are remedied and these objects achieved in a system such as shown in my prior patent and in the system illustrated in the accompanying drawing, by placing in the control circuit of such a system a pressure operated indexing valve having a piston or diaphragm, operated by variations in the fluid pressure in that place of the control circuit, for moving a pawl and ratchet wheel with each variation of that pressure, which pawl and ratchet, after a predetermined number of actuations, will allow an increased stroke of the ratchet

2 arm to allow closure of the valve by the actuating piston or diaphragm.

A device constructed in accordance with the above outline is shown in the accompanying drawings, in which.

Figure 1:
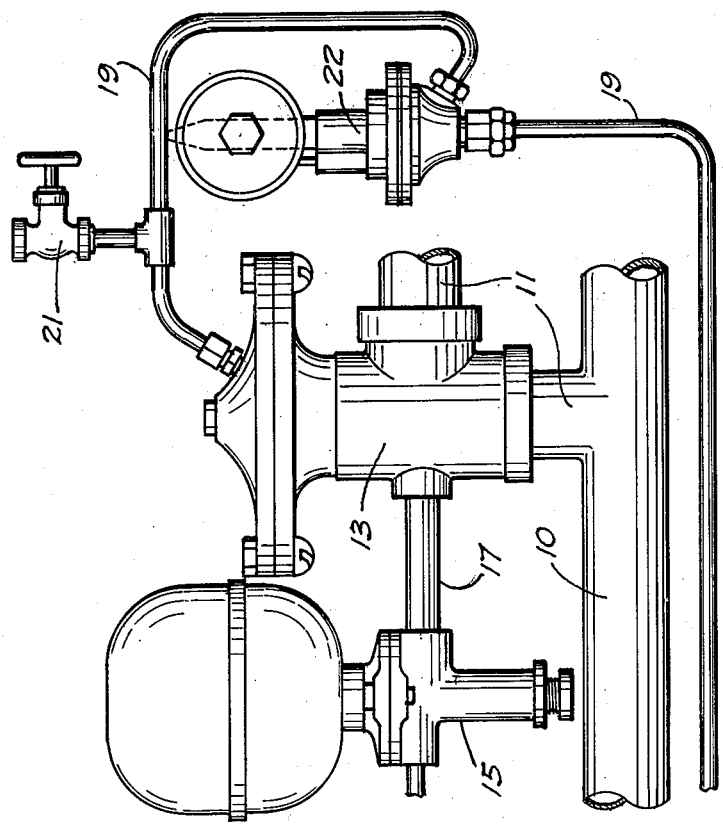
Fig. 1 is a diagrammatic sketch of a fluid cycling system having incorporated therein a pressure operated indexing valve, two groups of branch valves and control valves.
Figure 1:
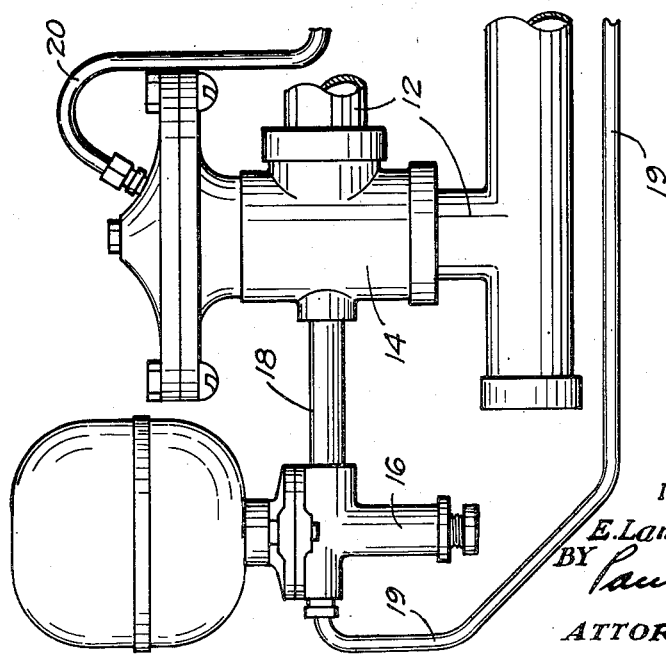
Figure 4:
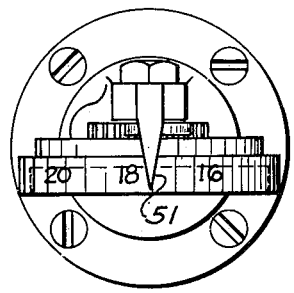
Fig. 4 is a plan view of the indexing valve.
Figure 5:
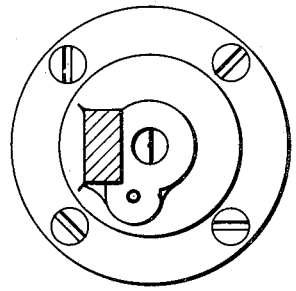
Fig. 5 is a sectional view on the line 5—5 of Figure 3.

The control system shown in Fig. 1 is similar to the one shown in Fig. 5 of the above mentioned patent.

Figure 6:
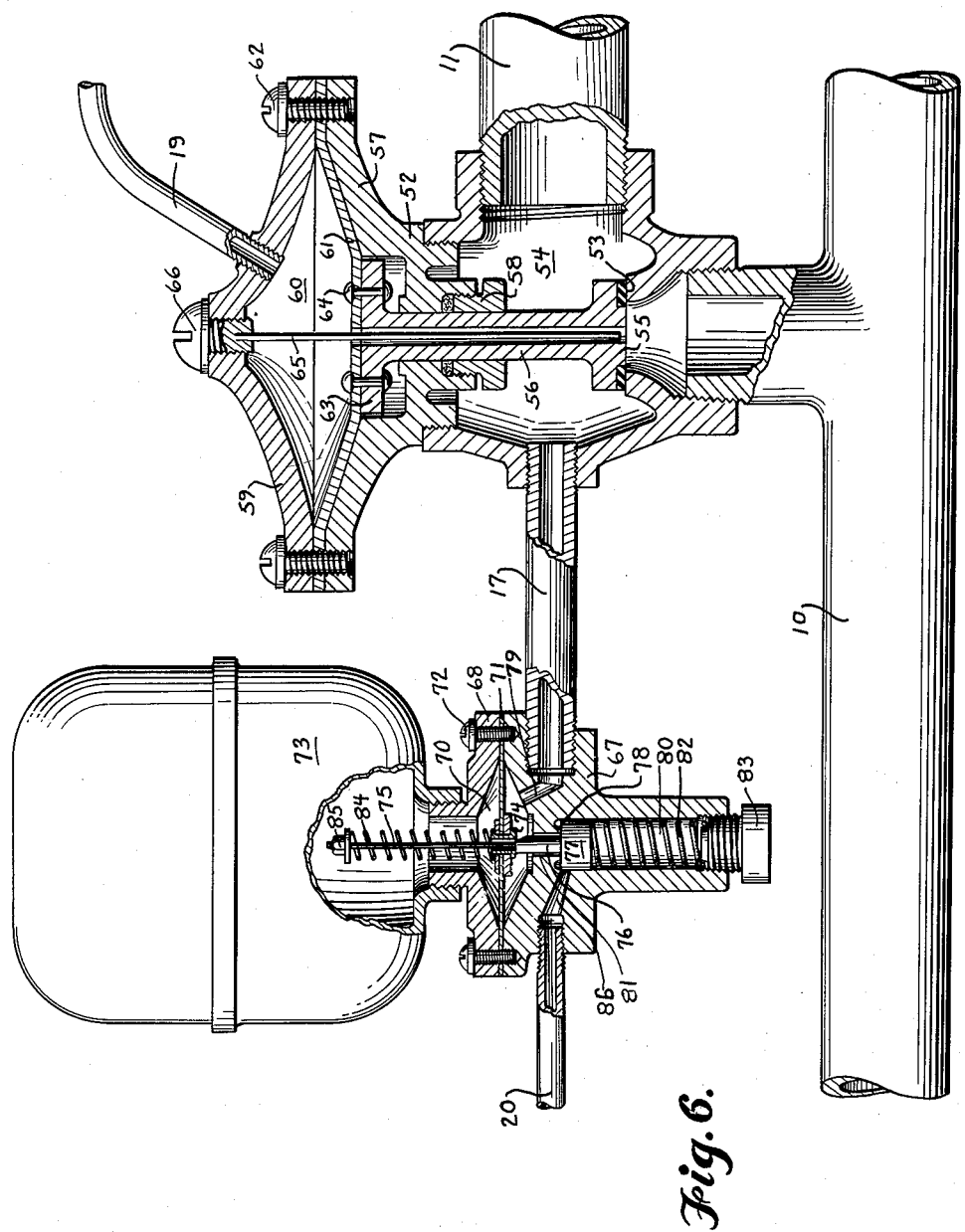
Fig. 6 is an enlarged vertical sectional view of one of the groups of branch and control valves.

In Fig. 1 there is shown a fluid supply header 10, with numerous branch pipes 11, 12. The flow of fluid through each branch is controlled by a branch valve 13, 14. Directing attention to Fig. 6 it can be seen that the valve body 52 of each branch valve has a valve seat 53 formed at the inlet end of its chamber 54 upon which seats a disk valve 55 for controlling the flow of fluid therethrough. The stem 56 for this disk valve is hollow and slidably extends upwardly through the center of a partitioning member 57 threaded into the upper end of the valve body 52. A stuffing box 58 is provided for the valve stem. The partitioning member is surmounted by a cap 59 and together therewith defines an upper chamber 60. This upper chamber is fitted with a diaphragm 61 which is clamped between the cap and partitioning member by screws 62. It will be noted that the upper end of the valve stem 56 is formed with a head plate 63 to which is secured the central portion of the diaphragm as by rivets 64. The bore in the valve stem continues through the diaphragm and receives a stationary needle 65 extending downwardly as an axial prolongation of a screw 66 threaded into the cap 59. This needle controls the bleeding of fluid from the lower chamber 54 to the upper chamber 60. Of importance is the fact that the head plate 63 is larger in area than the disk valve 55 so that when the pressure in the upper chamber approaches that in the lower chamber the valve will be urged against its seat 53.

The lower chamber 54 of each branch valve is connected to the base member 67 of a control valve, or pilot 15, 16, by a loading line 17, 18. This base member together with a crowning member 68 defines an open-topped intermediate chamber 70 which is partitioned by a diaphragm 71 held in position by screws 72. The portion of the chamber above the diaphragm is in direct communication with a pressure tank 73 mounted on the lower portion of the chamber and connects by a passage 79 with the respective loading line 17, 18. Extending through a hollow rivet 74 in the center of the diaphragm is a reduced stem 75 continuing as an axial prolongation of the primary stem 76 of a valve 77 seated by its upper face against a seat 78. The latter is located between a lower chamber 80 and a bore 81 leading up into the intermediate chamber and is of a diameter exceeding that of the primary stem 76 extending therethrough.

A compression spring 82 is retained in the lower chamber 80 by a base screw plug 83 and yieldingly urges the valve into a closed position. The diaphragm is localized with respect to the valve by a spring 84 which is held against the upper side of the diaphragm by a nut 85 so that the rivet is always seated against the shoulder between the valve stems. It should be noted that a portion of this shoulder is bevelled so that fluid can always pass through the rivet from one side of the diaphragm to the other.

The upper end of the lower chamber 80 is connected by a passage 86 with one end of a respective release line 19, 20 which has its other end connected to the cap of the branch valve which the pilot valve controls. The release line 19 from the last control valve 16 in the line is connected to the first branch valve 13 in the line, so that the system may cycle indefinitely. A starting valve 21 is placed in the release line nearest the desired control point, but may be placed in any of the release lines 19, 20. Also, in one of the release lines there is placed the pressure operated indexing valve 22, shown schematically in Fig. 1 and in more detail in Figs. 2, 3, 4 and 5.

The pressure operated indexing valve is shown in detail in Figs. 2, 3, 4 and 5. The location of this indexing valve is a matter of convenience and may be placed in the release line leading to the starting valve, as such line would probably be the most accessible, although it may be placed in any of the loading or release lines which make up the pilot, or control, circuit of the system. Taking this indexing valve as having been placed in the release line 19, the operation of the system described so far is as follows:

With the starting valve 21 closed, when water is first supplied to the header 10, the branch valves 13, 14 close because the water passes through the hollow valve stems 56 into the upper chambers 60 and loads the diaphragms 61. The system is started in operation by opening the starting valve 21 to relieve the pressure in the release line 19. The release of pressure in this line 19 will unload the diaphragm 61 in the branch valve 13, allow its disk valve 55 to open and start water flowing in the branch line 11. The flow of water through the branch valve 13 will cause a pressure to build up in the pressure tank 73 of the control valve 15 through the loading line 17, passage 79, and rivet 74. After water has flowed in the branch 11 for a sufficient time to load the pressure tank of the control valve 15, the starting valve 21 is closed. After this closing of the starting valve the pressure will start to build up on the diaphragm 61 in the branch valve 13 and very soon the valve will close. The closing of this branch valve 13 instantly relieves the pressure in the loading line 17 connected to the control valve 15, and hence relieves the pressure on the underside of its diaphragm 71. As a result the pressure in the pressure tank acting on the diaphragm of the control valve will cause its valve 77 to open and relieve the pressure in the release line 20 via the passage 86, bore 81, passage 79, line 17, and branch line 11. This allows the branch valve 14 to open, and water to flow in the discharge, or branch, line 12, from the valve 14. If more valves are in series than shown in the drawings, this will be repeated seriatim until the last control valve in the series relieves the pressure in the release line 19 of the last valve in the series, which will again start the operation and allow the first valve 13 in the series to open, and water to flow in the first branch, or discharge, pipe 11. From the operation above described, it will be apparent that the pressure in the release and loading lines is increased and decreased with each cycle of operation of the valves; and, that if the pressure in the control circuit is not relieved, no branch valve will open, and that failure of any one valve to open, will bring the cycle of operation of the system to a halt.

It is an object of the present invention to obtain this cessation of cycling of the system after a predetermined number of cycles, and to do this by using the intermittent pressure in the control circuit. To accomplish this, an indexing valve 22 is placed in the control circuit. While the indexing valve has been shown as placed in one of the release lines, it may be placed in one of the loading lines with equal desirability.

Figure 2:
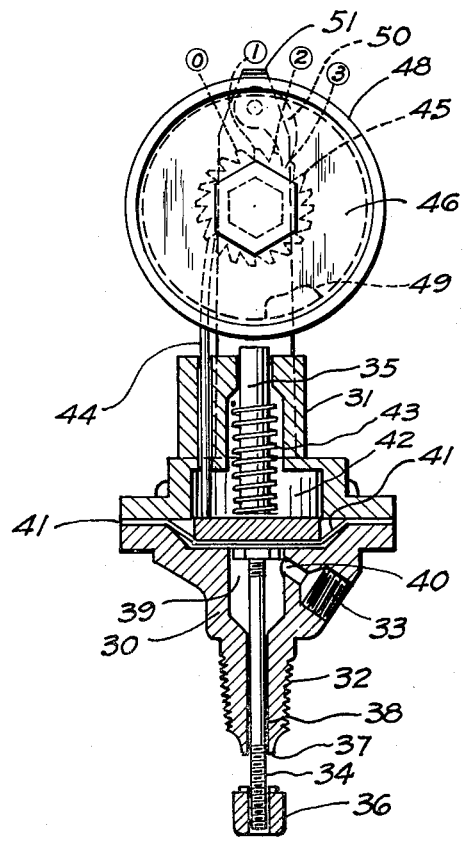
Fig. 2 is an elevational sectional view of an indexing valve embodying the present invention.
Figure 3:
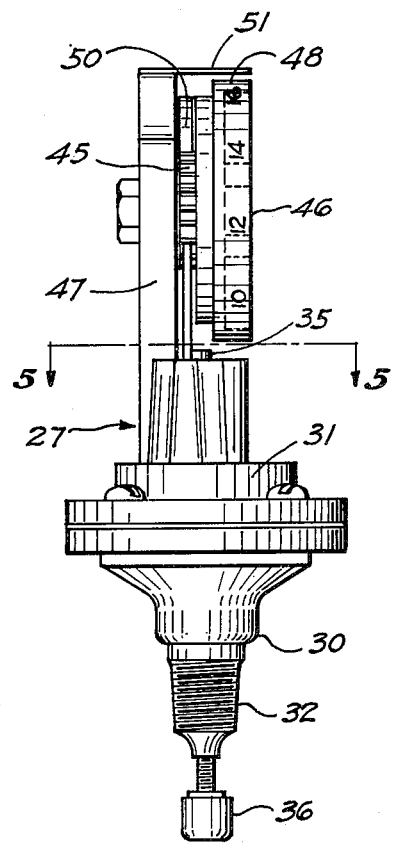
Fig. 3 is a side elevational view of the indexing valve.

Figures 2, 3, 4 and 5 show details of the indexing valve 22. Fig. 2 is a sectional elevational view of the valve, which is divided into a base part 30 and a cap part 31. The release line 19 from the control valve 16 is provided with a fitting that will secure to the male threads 32 on the base of the indexing valve. The release line 19 from the branch valve 13 is provided with a fitting that will secure to the female threads 33, in the base of the indexing valve. The valve has a composite stem with a lower part 34 and an upper part 35. The lower part 34 carries the valve head 36, which upon sufficient movement of the stem, will close on the valve seat 37, to close the control passage 38 and the release line 19. The control passage 38 connects with a diaphragm base chamber 39 and the branch passage 40. The base portion 39 of the diaphragm chamber is closed and the base 30 is separated from the cap 31 by a diaphragm 41. Secured to the diaphragm and to each other are the lower part 34 and the upper part 35 of the valve stem. A diaphragm cap chamber 42 is formed in the cap and houses the upper part 35 of the valve stem and a valve spring 43 that biases the valve downward into open position. Attached to the upper part of the valve stem is a flexible pawl pin 44. This pawl 44 is guided in the cap and extends upward and out of the cap to engage the teeth 45 of a ratchet wheel 46. This ratchet wheel is mounted for rotation on a standard 47 which is integral with the cap 31. The ratchet teeth are arranged radially of the wheel but inward from its periphery 48. On the periphery 48 of the wheel are placed a series of sequential numbers in correspondance with the ratchet teeth. The upper part 35 of the valve stem is of such a length that it will permit movement of the stem but will engage the periphery 48 to prevent closure of the valve head 36 on its seat 37. The spring pawl 44 is of a length that will engage and move the ratchet teeth 45. The movement of the valve stem from its low position to a position against the periphery of the wheel is sufficient to index the wheel a distance of one tooth. Further movement of the stem would close the valve and the pawl would be disengaged by the action of the following tooth on the side of the spring pawl 44. This further movement of the pawl and closing of the valve is allowed for by forming a notch 49 in the periphery of the wheel. Thus it will be evident that once during rotation of the wheel the valve may close. Backward movement of the wheel is prevented by a dog 50 that engages the ratchet teeth. A pointer 51 is provided and mounted on the top of the standard 47. The periphery 48 of the wheel is numbered clockwise, as indicated in Fig. 2, with the direction of rotation of the wheel by the pawl. The numbering is so placed that when the notch 49 is entered by the upper part 35 of the stem, the figure zero will be under the pointer and the figure one will be next and on the right of the zero. As indicated in Fig. 2, one more actuation by the pawl will place the zero under the pointer and allow the valve stem 35 to enter the notch 49.

In a system constructed as shown in Fig. 1, when the main 10 is filled with water under pressure and the relief valve 21 is opened, water will flow in the branch pipe 11 until the relief valve is closed and pressure again builds up above the diaphragm of the branch valve. This building up of pressure will close the branch valve and again place the release line 19 under pressure. Closing of the branch valve activates the next control valve and then the following branch valve, and so through the system, and the system will continue to cycle until a valve is closed in one of the pipes, or lines, of the system.

With the indexing valve 22 in the release line, the operation of the system will come to a stop after a predetermined number of cycles. The cycles are predetermined by setting the number on the wheel corresponding to the desired number of cycles opposite the pointer, opening the starting valve 21 to initiate a cycle, and closing the starting valve after the pressure chamber of the first control valve has been loaded. Closing of the starting valve 21 allows pressure to build up in the release line 19 until the pressure will operate the diaphragm 41 against the spring 43. This movement of the diaphragm will operate the pawl to index the ratchet teeth 45 and wheel 46 the distance of one tooth and one number on the face 48 of the wheel. The upper end 35 of the upper valve stem will strike against the face of the wheel to limit movement of the valve stem and prevent closing of the valve. This operation is on the assumption that the indexing valve has been set for more than one cycle of operation of the system.

Pressure will remain in the relief line 19 until the system has continued in sequential operation of the branch valves and reached the last in the system before the first one operated. Then the last control valve 16 in the line will relieve the pressure in the relief line 19, the diaphragm 41 in the indexing valve 22 will be lowered, the first branch valve 13 will open, and the system will begin another cycle.

These cycles will continue for the predetermined number, less one, when the upper end of the valve stem of the indexing valve will enter the recess 49 in the ratchet wheel 48, and this will allow extra movement of the valve stem to close the valve head 36 upon its seat 37 and stop the flow of water through the valve and the relief line 19. At the end of the last cycle when the end control valve 16 opens to relieve the pressure in the line 19, the pressure will be relieved only between the end valve 16 and the indexing valve 22. The part of the relief line 19 between the indexing valve and the first branch valve 13 will remain under pressure from the main 10 through the weep, or leak, opening in the valve stem leading to the top of the piston, or diaphragm. This failure to relieve all of the pressure in the line 19 will stop the cycling of the system after the set predetermined number of cycles.

If the indexing valve is placed in a loading line such as 17, the branch passage 40 may be connected to the control valve and the control passage 38 to the branch valve. A starting valve should be placed between the indexing valve and the control valve. It may also be necessary to have a starting valve in one of the control lines to take care of abnormal conditions, as when the pressure chamber of the control valve next to the indexing valve has no positive pressure for initial actuation of the control valve upon opening of the starting valve connected to the control line.

This indexing valve 22 may be placed in similar control circuits, such as any of those shown in my aforementioned patent, to stop the operation of the controls and branch valves shown therein.

Having thus described my invention, I claim:

1. A fluid cycling system, having: a series of valves, means for supplying fluid under pressure to said valves, a separate control circuit connected between each of said valves so that all are thereby connected in series, said valves being actuated seriatim by control pressure changes in each of said circuits, an indexing means operative as a function of the quantity flow of such fluid, and a valve responsive to a predetermined number of indexing operations by said indexing means for closing one of said circuits whereby said series of valves is rendered inactive.

2. A fluid cycling system, having: a series of valves, a separate control circuit connected between each of said valves so that all are thereby connected in series, said valves being actuated seriatim by control pressure changes in each of said circuits, an indexing means operative by such control pressure changes, and a valve responsive to a predetermined number of indexing operations by said indexing means for closing one of said circuits whereby said series of valves is rendered inactive.

3. A main valve; a control circuit connected to said valve, said main valve being actuated by control pressure changes in said circuit; in said circuit a control valve responsive to and actuated by a control pressure change in said circuit, and said control valve effecting the control pressure change actuating said main valve; and an indexing valve operatively connected in said circuit, said indexing valve having indexing means operative by such control pressure changes, and valve means responsive to a predetermined number of indexing operations by said indexing means for closing said circuit whereby said control valve and said main valve are rendered inactive.

4. A series of main valves, a separate control circuit connected between each of said main valves so that all of said main valves are thereby connected in series and will operate in each of such circuits a control valve responsive to and actuated by control pressure changes in its circuit so that said main valves will operate seriatim, and an indexing valve operatively connected in one of such circuits; said indexing valve having indexing means operative by such control pressure changes, and valve means responsive to a predetermined number of indexing operations by said indexing means for closing such one circuit whereby the control valve in such one circuit and said main valves are rendered inactive.

5. A fluid cycling system, having: a series of main valves; a separate control circuit connected between each of said main valves so that all of said main valves are thereby connected in series, said main valves being actuated by control pressure changes in said circuits; in each of said circuits a control valve responsive to and actuated by a control pressure change in said circuit, each of said control valves effecting a control pressure change in its circuit to actuate a main valve connected to its circuit so that said main valves will be actuated seriatim; and an indexing valve operatively connected in one of said circuits, said indexing valve having indexing means operative by such control pressure changes in its circuit, and valve means responsive to a predetermined number of indexing operations by said indexing means for closing said one circuit whereby the control valve in said one circuit and, hence, the other valves in said system are rendered inactive.

6. A series of main valves, each of said main valves having as a valve closing means a fluid reservoir subject to control pressure changes for the actuation of its valve, and a valve chamber; each of said valve chambers having connected thereto and having in communication therewith a loading line; a control valve connected to each of said loading lines and responsive to and actuated by control pressure changes in its loading line; a release line connected to and between each of said control valves and one of said fluid reservoirs so that all of said main valves are thereby connected in series and whereby actuation of a said control valve will effect a control pressure change in its release line and thereby effect a control pressure change in its connected fluid reservoir to actuate the main valve associated with the reservoir to thereby effect a control pressure change in its valve chamber, connected loading line, and actuation of the control valve connected to such loading line, and, thence, a seriatim actuation of all said main valves; and an indexing valve operatively connected in one of said lines, said indexing valve having indexing means operative by such control pressure changes in its line, and valve means responsive to a predetermined number of indexing operations by said indexing means for closing said one line whereby said control valves and said main valves are rendered inactive.

7. In a fluid distribution system the combination of a fluid pressure supply header a plurality of fluid discharge branches leading therefrom, in each of said branches a valve which is held closed by the pressure of the fluid in such header acting on a surface of such valve and which valve is opened when such pressure is relieved, pilot mechanism for intermittently relieving said pressure on each of said valves and operating said valves in sequence, and, operatively connected to one of said valves, an indexing valve actuated by the intermittent fluid pressure change in said valves and adapted to terminate the operation of said valve and pilot mechanism after a predetermined number of pressure changes.

8. In a fluid distribution system the combination of a fluid pressure supply header a plurality of fluid discharge branches leading therefrom, in each of said branches a valve which is held closed by pressure of the fluid in such header acting on a surface of such valve and which valve is opened when such pressure is relieved, fluid pressure actuated pilot mechanism for relieving such pressure on each such valve surface consequent upon the closing of a previously open valve to operate such valves in sequences, and, operatively connected to one of said valves an indexing valve actuated by the intermittent fluid pressure change in such one valve and being adapted to terminate the operation of said one valve.

9. In a fluid distribution system the combination of a fluid pressure supply header, a plurality of fluid discharge branches leading therefrom, in each of said branches, a branch valve which is held closed by the pressure of the fluid in such header acting on a surface thereof and opened when the pressure of such fluid is relieved, a pilot conduit and pilot valve connected between each of said branch valves by which said pilot valves are opened and closed in sequence and the pressure in such conduit is changed, and, in one of said pilot conduits an indexing valve having a ratchet member operatively connected to a surface yieldable to the fluid in such conduit and adapted to close said one conduit after a predetermined number of operations of said ratchet.

10. In a fluid distribution system the combination of a fluid pressure supply header, a plurality of fluid discharge branches leading therefrom, in each of said branches a branch valve which is held closed by the pressure of the fluid in such header acting on a surface of such valve and which valve is opened when such pressure is relieved, between each of said valves a pilot conduit and a pilot valve adapted to be opened and closed by fluid pressure changes occurring during the opening and closing of one of such branch valves to which it is connected, and, operatively connected in one of said pilot conduits an indexing valve actuated by fluid pressure changes in said conduit for closing said conduit after a predetermined number of pressure changes.

E. LAMAR GAINES.

REFERENCES CITED

The following references are of record in the file of this patent:

UNITED STATES PATENTS

| Number | Name | Date |
| --- | --- | --- |
| 981,271 | Hutchins | Jan. 10, 1911 |
| 1,768,305 | Bentley | June 24, 1930 |
| 2,368,832 | Hauser | Feb. 6, 1945 |